(12) United States Patent
Knoedgen et al.

(10) Patent No.: US 10,103,633 B1
(45) Date of Patent: Oct. 16, 2018

(54) SWITCHING CONVERTER WITH POWER LEVEL SELECTION

(71) Applicant: Dialog Semiconductor (UK) Limited, London (GB)

(72) Inventors: Horst Knoedgen, Munich (DE); Christoph Nagl, Graz (AT); Nebojsa Jelaca, Graz (AT)

(73) Assignee: Dialog Semiconductor (UK) Limited, London (GB)

(*) Notice: Subject to any disclaimer, the term of this patent is extended or adjusted under 35 U.S.C. 154(b) by 0 days.

(21) Appl. No.: 15/692,333

(22) Filed: Aug. 31, 2017

(51) Int. Cl.
| | |
|---|---|
| *H02M 3/158* | (2006.01) |
| *H02M 1/096* | (2006.01) |
| *H02M 7/487* | (2007.01) |
| *H02M 1/36* | (2007.01) |
| *H02M 1/00* | (2006.01) |

(52) U.S. Cl.
CPC ......... *H02M 3/1584* (2013.01); *H02M 1/096* (2013.01); *H02M 1/36* (2013.01); *H02M 3/1582* (2013.01); *H02M 7/487* (2013.01); *H02M 2001/0016* (2013.01); *H02M 2001/0032* (2013.01)

(58) Field of Classification Search
CPC .... H02M 3/155–3/1588; H02M 1/096; H02M 1/36; H02M 7/487; H02M 2001/0016; H02M 2001/0032
See application file for complete search history.

(56) References Cited

U.S. PATENT DOCUMENTS

| | | | | |
|---|---|---|---|---|
| 6,069,803 | A * | 5/2000 | Cross | H02M 3/33569 363/21.14 |
| 6,480,403 | B1 * | 11/2002 | Bijlenga | H02M 7/487 363/132 |
| 8,582,331 | B2 * | 11/2013 | Frisch | H02M 7/48 363/131 |
| 9,214,852 | B2 * | 12/2015 | Dong | H02M 1/36 |
| 9,710,008 | B2 * | 7/2017 | Svorc | G05F 3/26 |
| 9,812,942 | B2 * | 11/2017 | Sato | H02M 1/088 |
| 9,853,547 | B2 * | 12/2017 | Bandyopadhyay | H02M 3/158 |
| 2002/0181252 | A1 * | 12/2002 | Hosotani | H02M 1/36 363/18 |
| 2003/0142514 | A1 * | 7/2003 | Hosotani | H02M 3/3385 363/21.02 |
| 2004/0070906 | A1 * | 4/2004 | Kohout | H02M 3/1588 361/92 |
| 2004/0155663 | A1 * | 8/2004 | Knoedgen | G01D 3/021 324/525 |
| 2005/0052168 | A1 * | 3/2005 | Tazawa | H02M 3/1584 323/282 |

(Continued)

*Primary Examiner* — Yusef A Ahmed
(74) *Attorney, Agent, or Firm* — Saile Ackerman LLC; Stephen B. Ackerman

(57) ABSTRACT

A converter and a method of operating a switching converter in a low power mode are presented. The invention relates to a III/V semiconductor switching converter. A switching converter contains a first power switch coupled to a second power switch via a switching node. There is an inductor coupled to the switching node, and a clamp circuit containing a third power switch is coupled in parallel to the first power switch. The switching converter is adapted to turn the first power switch off and to enable control of the third power switch upon identifying that the switching converter provides a low level of power.

17 Claims, 5 Drawing Sheets

(56) References Cited

U.S. PATENT DOCUMENTS

| | | | |
|---|---|---|---|
| 2006/0022653 A1* | 2/2006 | Reed | H02M 3/158 323/282 |
| 2006/0176715 A1* | 8/2006 | Hosotani | H02M 3/33569 363/21.01 |
| 2006/0193152 A1* | 8/2006 | Ushijima | H02M 7/53838 363/13 |
| 2008/0068868 A1* | 3/2008 | Williams | H01L 27/0605 363/21.06 |
| 2009/0102445 A1* | 4/2009 | Ito | H02M 3/156 323/283 |
| 2009/0135632 A1* | 5/2009 | Sohma | G05F 1/56 363/89 |
| 2009/0196072 A1* | 8/2009 | Ye | H02M 7/493 363/17 |
| 2009/0219006 A1* | 9/2009 | Gekinozu | H02M 3/1582 323/304 |
| 2010/0237841 A1* | 9/2010 | Matsuo | H02M 3/1588 323/282 |
| 2011/0075455 A1* | 3/2011 | Sigamani | H02M 7/48 363/71 |
| 2011/0115456 A1* | 5/2011 | Tanifuji | H02M 3/156 323/283 |
| 2011/0181255 A1* | 7/2011 | Hashimoto | H02M 3/1588 323/272 |
| 2012/0014150 A1* | 1/2012 | Domb | H02M 1/4208 363/89 |
| 2012/0187934 A1* | 7/2012 | Suzuki | H02M 3/156 323/311 |
| 2012/0212981 A1* | 8/2012 | Lin | H02M 3/33507 363/21.15 |
| 2012/0294056 A1* | 11/2012 | Temesi | H03K 17/08128 363/131 |
| 2013/0049654 A1* | 2/2013 | Kure | B60L 3/003 318/400.2 |
| 2013/0234621 A1* | 9/2013 | Athalye | H02M 3/158 315/307 |
| 2015/0036403 A1* | 2/2015 | Yu | H02M 7/5387 363/132 |
| 2015/0084612 A1* | 3/2015 | Kanzaki | H02M 3/158 323/282 |
| 2015/0097613 A1* | 4/2015 | Roewe | H03K 17/0822 327/382 |
| 2015/0137857 A1* | 5/2015 | Kusama | H02M 1/08 327/109 |
| 2015/0138858 A1* | 5/2015 | Kusama | H02M 7/537 363/123 |
| 2015/0326121 A1* | 11/2015 | Torres | H02M 3/158 323/271 |
| 2016/0181948 A1* | 6/2016 | Eckel | H02M 1/32 363/131 |
| 2016/0226479 A1* | 8/2016 | Xu | H03K 17/56 |
| 2017/0302179 A1* | 10/2017 | Bandyopadhyay | H02M 1/08 |

\* cited by examiner

SWITCHING CONVERTER WITH POWER LEVEL SELECTION

TECHNICAL FIELD

The present disclosure relates to a low power switching converter and a method of operating a switching converter in a low power mode. In particular, the present disclosure relates to a III/V semiconductor switching converter.

BACKGROUND

Transistors based on III/V semiconductors such as Gallium Nitride, GaN, display a relatively low on-resistance and can achieve higher switching speed compared to their silicon-based counterpart. As such, GaN transistors are well suited for the design of fast power switching converters. However, current GaN-based switching converters are not suitable for low-power applications.

It is an object of the disclosure to address one or more of the above-mentioned limitations.

SUMMARY

According to a first aspect of the disclosure, there is provided a switching converter comprising: a first power switch coupled to a second power switch via a switching node; an inductor coupled to the switching node; and a clamp circuit comprising a third power switch coupled in parallel to the first power switch; the switching converter being adapted to turn the first power switch off and to enable control of the third power switch upon identifying that the switching converter provides a low level of power.

For example, the first power switch may be a high-side power switch and the second power switch may be a low-side power switch. A low level of power may be a level of power that is less than a reference power value. The reference power value may be set as minimum power value which may be a percentage of a normal power of the switching converter. Alternatively, the minimum value may be defined by a minimum amount of power required to operate a driver operating the first power switch.

Optionally, the switching converter may comprise a controller coupled to the clamp circuit, the controller being adapted to sense an electrical parameter of the switching converter; and to compare the electrical parameter with a threshold value to identify the level of power of the switching converter.

For example, the electrical parameter may be a parameter associated with a level power provided by the converter. Such a parameter may include one or more of the output power, the output voltage, the load current and the duty cycle of the switching converter.

Optionally, the third power switch may be coupled to a capacitor, the clamp circuit being adapted to turn off the third power switch when the second power switch is turned on, to charge the inductor; and to turn on the third power switch when the second power switch is turned off, to charge the capacitor.

Optionally, the third power switch comprises a power transistor having a first terminal coupled to a ground via a ground isolation switch, a second terminal coupled to the switching node; and a third terminal coupled to the capacitor.

Optionally, the clamp circuit comprises a control switch coupled in parallel between the first and the second terminal of the third power switch.

Optionally, the clamp circuit comprises a Zener diode coupled in parallel with the control switch. The Zener diode may be a III/V semiconductor based Zener diode. For instance, the Zener diode may be implemented by three GaN diodes coupled in series.

Optionally, the clamp circuit comprises a resistor coupled in parallel between the first terminal and the third terminal of the third power switch. The resistor may be a III/V semiconductor based resistor such as a GaN resistor.

Optionally, the third power switch may be an enhancement mode power switch.

Optionally, the clamp circuit comprises a filter coupled in parallel to the control switch.

Optionally, at least one of the first power switch, the second power switch and the third power switch is a III/V semiconductor based transistor. For example, the III/V semiconductor may be a GaN semiconductor.

According to a second aspect of the disclosure, there is provided a method of operating a switching converter comprising a first power switch coupled to a second power switch via a switching node, an inductor coupled to the switching node and a capacitor; the method comprising providing a third power switch coupled in parallel to the first power switch; and upon identifying that the switching converter provides a low level of power, turning the first power switch off, and enabling control of the third power switch.

Optionally, the method comprises sensing an electrical parameter of the switching converter; and comparing the electrical parameter with a threshold value.

Optionally, the method comprises turning off the third power switch when the second power switch is turned on to charge the inductor; and turning on the third power switch when the second power switch is turned off to charge the capacitor.

Optionally, turning off the third switch comprises lowering a gate voltage of the third switch.

According to a third aspect of the disclosure, there is provided a clamp circuit for use with a half bridge, the clamp circuit comprising a power switch having a first terminal for coupling to a ground, a second terminal for coupling to a switching node; and a third terminal for coupling to a capacitor.

Optionally, the clamp circuit comprises a control switch coupled in parallel between the first and the second terminal of the power switch.

Optionally, the clamp circuit comprises a Zener diode coupled in parallel with the control switch.

Optionally, the clamp circuit comprises a resistor coupled in parallel between the first terminal and the third terminal of the power switch.

Optionally, the power switch may be an enhancement mode power switch.

Optionally, the clamp circuit comprises a filter coupled in parallel to the control switch.

Optionally, at least one of the power switch, the resistor and the Zener diode is a III/V semiconductor based component. For example, the III/V semiconductor may be a GaN semiconductor.

BRIEF DESCRIPTION OF THE DRAWINGS

The disclosure is described in further detail below by way of example and with reference to the accompanying drawings, in which.

DESCRIPTION

Figure 1:
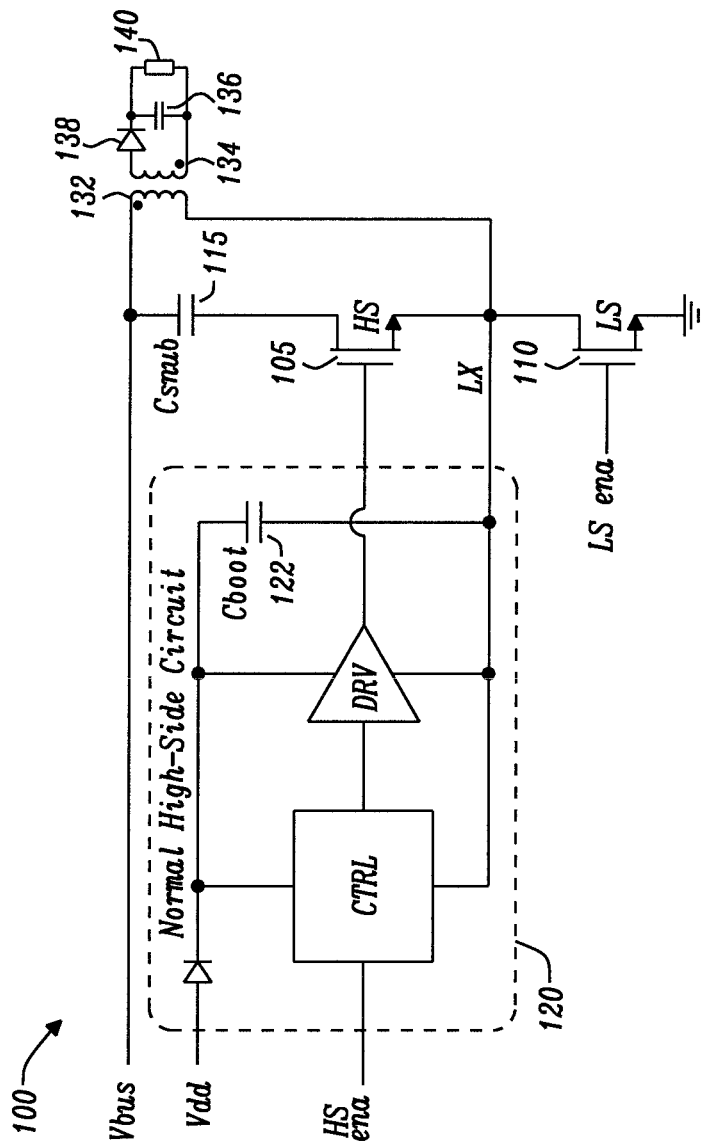
FIG. 1 is a diagram of a switching converter according to the prior art.

FIG. 1 illustrates a conventional fly-back power converter 100 for providing an output voltage to a load 140. The circuit 100 includes a so-called half-bridge formed by a high side power switch 105 coupled to a low side power switch 110 via a switching node LX. The high side power switch 105 has a first terminal coupled to an input voltage Vbus via a capacitor Csnub 115, a second terminal coupled to the switching node, and a third terminal coupled to a high side driver 120. The high-side driver 120 includes a boot capacitor Cboot 122 for powering the high-side driver. The boot capacitor 122 is coupled at one end to a voltage Vdd via a diode, and at another end to a ground via the low side power switch 110. Control circuitry is provided to control the gate voltage of the high side switch 105.

The low side power switch 110 has a first terminal coupled to the switching node LX, a second terminal coupled to the ground and a third terminal coupled to a low side driver, not shown, for operating the low side power switch. A transformer has a primary winding 132 coupled to a secondary winding 134. The primary winding 132 is coupled at one end to the switching node LX and at another end to the capacitor Csnub 115. The secondary winding 134 is coupled in parallel to an output capacitor 136. A diode 138 is provided between the secondary winding 134 and the output capacitor 138.

In operation, the low side switch 110 also referred to as main switch is turned on and off alternatively. When the low side power switch 110 is closed, the primary winding is connected to the input voltage Vbus. The current in the primary winding 132 increases and a voltage induced in the secondary winding 134 is negative. As a result, the diode 138 is reverse-biased and energy is provided to the load 140 by the output capacitor 136. When the low side power switch 110 is open, the primary winding 132 is disconnect from the ground and cannot charge. The current in the primary winding 132 decreases and a voltage induced in the secondary winding 134 is positive. The diode 138 is forward-biased, allowing the transformer to provide energy to both the load 140 and to the output capacitor 136, hence recharging it.

The capacitor Csnub 115 in parallel with the primary winding 132, provides a circuit also referred to as passive snubber circuit for suppressing voltage overshoots. These overshoots can be caused by the leakage inductance of the transformer when the high side and low side power switches are operated. Such a passive snubber circuit however dissipates energy and therefore decreases the efficiency of the converter. To reduce power losses in the snubber circuit, the high side power switch 105 is used as an active clamp. The high-side driver 120 is powered by the boot capacitor Cboot 122. The boot capacitor 122 can only charge up when the low-side power switch 110 is turned on (closed). However, in a low-power mode, the on-time of the low-side power switch 110 only last for a relatively short time. As a result, the boot capacitor 122 cannot charge sufficiently to provides enough power to operate the high-side driver 120 reliably.

If the switching converter 100 were to be designed using GaN technology, it would require even more energy. Since GaN technology does not provide p-channel devices, such as p-channel transistors, the power converter would need to be designed using n-channel devices. Such n-channel transistors operate in enhancement mode HEMT and therefore require a significant amount of power.

Figure 2:
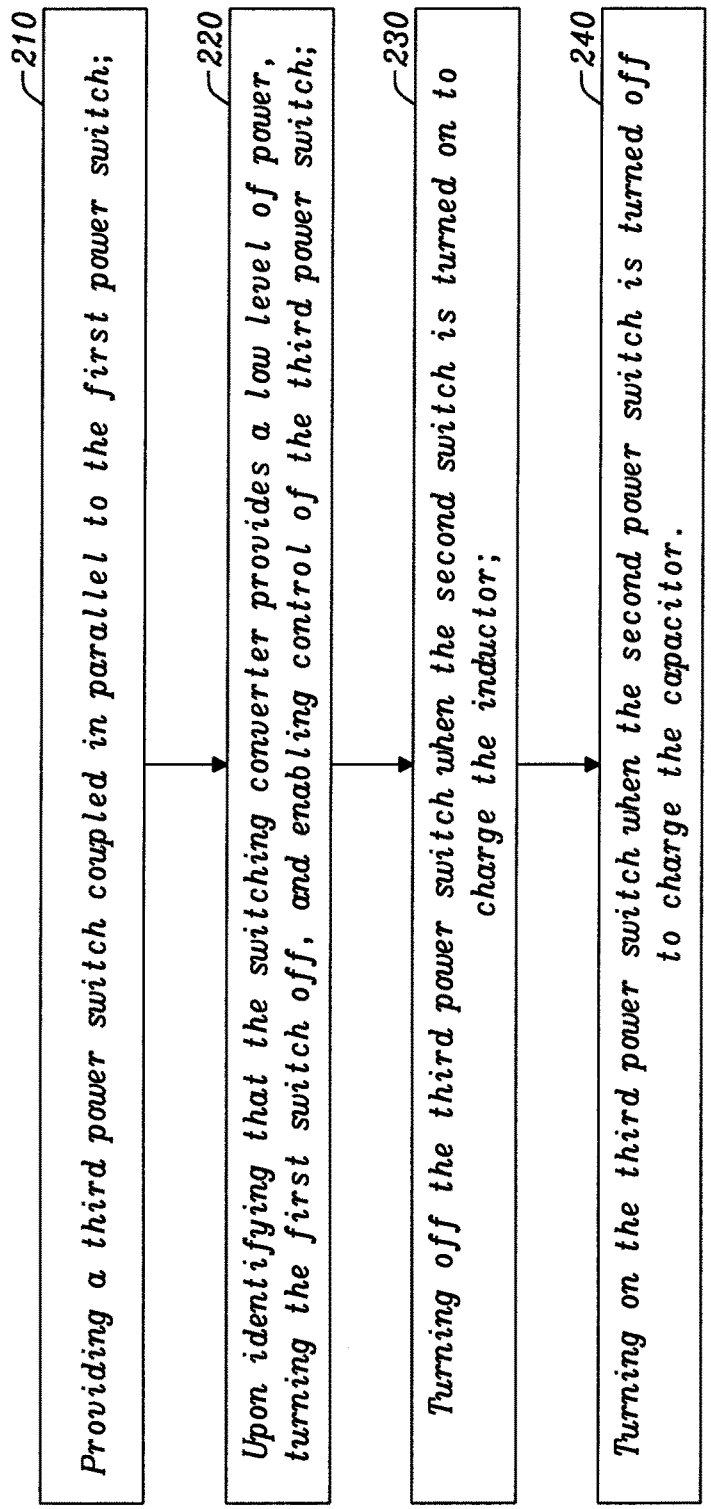
FIG. 2 is a flow chart of a method for operating a switching converter in a low-power mode.

FIG. 2 is a flow chart of a method of operating a switching converter comprising a first power switch coupled to a second power switch via a switching node; an inductor coupled to the switching node, and a capacitor.

At step 210, a third power switch, also referred to as clamp switch, is provided. The third power switch is coupled in parallel to the first power switch.

At step 220, the first power switch is turned off, and control of the third power switch is enabled upon identifying that the switching converter provides a low level of power. Identifying that the switching converter is operating in a low power mode may be achieved by sensing an electrical parameter of the switching converter. For example, the electrical parameter may be a parameter associated with a level power provided by the converter. Such a parameter may include one or more of the output power, the output voltage, the load current and the duty cycle of the switching converter. The electrical parameter may then be compared with a threshold value. For example, the threshold value may correspond to a minimum amount of power provided by the switching regulator. Such a minimum amount of power may be defined by a percentage, for instance less than 1% or less than 5%, of the power provided by the switching regulator in a normal mode of operation. For example, if the switching converter provides about 100 Watts in a normal mode then a low power mode may be identified when the switching regulator provides less than 5 Watts. Such a threshold value may depend on the type of converter being used and on the application. The threshold value may also correspond to a minimum load current or a maximum output voltage of the switching converter. For example, a low power mode of operation may be identified when the output voltage increases beyond the maximum output voltage value.

Alternatively, the threshold value may be defined by the minimum amount of power required to operate the high-side driver reliably. As explained above, this depends on the on-time of the low-side power switch.

At step 230, the third power switch is turned off when the second power switch is turned on, to charge the inductor.

At step 240, the third power switch is turned on, when the second power switch is turned off, to charge the capacitor.

Figure 3:
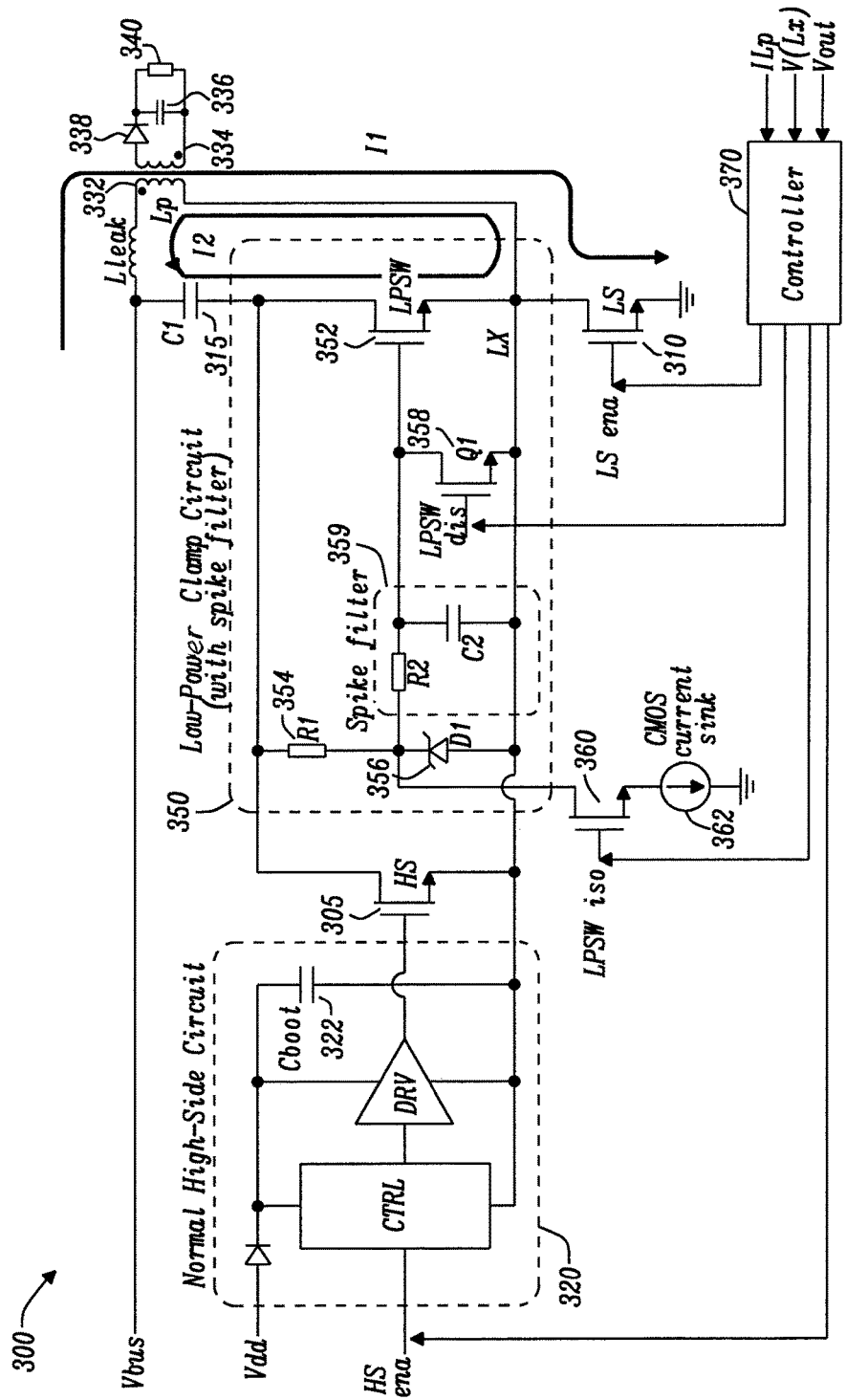
FIG. 3 is a diagram of a fly-back switching converter provided with a low-power clamp circuit.

FIG. 3 is a diagram of a power converter 300 for use in a low power mode. In this example, the power converter 300 is a fly-back converter provided with an active-clamp circuit 350, also referred to as low-power active-clamp circuit, which can be used when there is very little or no load applied to the switching converter.

The circuit 300 includes a high side power switch 305 coupled to a low side power switch 310 via a switching node LX. The high side power switch 305 has a first terminal coupled to an input voltage Vbus via a capacitor C1 315, a second terminal coupled to the switching node, and a third terminal coupled to a high side driver 320. In this example, the high-side driver 320 is identical to the high-side driver described with respect to FIG. 1. The high-side driver 320 includes a boot capacitor Cboot 322 for powering the high-side driver. The low side power switch 310 has a first terminal coupled to the switching node LX, a second terminal coupled to the ground and a third terminal coupled to a low side driver, for operating the low side power switch.

A transformer has a primary winding 332 coupled to a secondary winding 334. The primary winding 332 is coupled at one end to the switching node LX and at another end to the capacitor C1 315. A discrete leakage inductor is shown to represent the energy leakage of the primary coil 332, which as part of any real transformer experiences coupling losses. The secondary winding 334 is coupled in parallel to an output capacitor 336. A diode 338 is provided between the secondary winding 334 and the output capacitor 336.

The clamp circuit 350 comprises a power switch 352, also referred to as low-power switch LPSW, coupled in parallel to the high-side power switch 305. For example, the low-power switch 352 may be an enhancement mode transistor such as a GaN transistor. The low-power switch 352 has a first terminal, for example a drain terminal coupled to the capacitor C1, a second terminal, for example a source terminal coupled to the switching node LX, and a third terminal, for example a gate terminal coupled to a ground via another switch, referred to as isolation switch 360, for controlling isolation of the low-power switch gate from the ground. An optional current sink 362 may be provided between the isolation switch 360 and the ground. The current sink 362 may be used to limit the current and therefore avoid overstressing the clamp circuit 350.

A resistance R1 354 is provided in parallel between the first terminal and the third terminal of the low-power switch 352. The resistor R1 354 may be implemented in GaN technology. In this case the resistance may display two-dimensional electron gas (2DEG) properties.

A Zener diode D1, 356, is provided in parallel between the second terminal and the third terminal of the low-power switch 352, hence clamping the gate voltage of the LPSW. For example, the Zener diode 356 can be implemented in GaN technology by three GaN diodes in series.

An additional switch, also referred to as disconnection switch Q1 358 is provided in parallel between the second terminal and the third terminal of the low-power switch. The disconnection switch 358 is provided to prevent self-activation of the low power switch 352 in a so-called normal operation mode.

Optionally, a filter, also referred to as gate protection filter 359, may be provided in parallel with the Zener diode. For example, the filter may be an RC filter. In this example, the filter 359 is provided by a capacitor C2 provided in parallel with the Zener diode 356 and a resistor R2 having a first terminal coupled to D1 356 and a second terminal coupled to C2.

A controller 370 is provided for generating a set of logic signals for driving the high side power switch 305, the low side power switch 310, the disconnection switch 358 and the isolation switch 360. The controller has multiple inputs for receiving a plurality of sensing signals. For instance, the controller can have a first input for receiving a current sensing signal of the current through the primary inductor, a second input for receiving a signal at the switching node such as a voltage at LX, and a third input for receiving an output signal such as the output voltage Vout of converter. The current through the primary winding 332 may be sensed via the low side switch 310. Optionally, the controller 370 may also receive a sensing signal of the input voltage Vbus. The controller 370 may be a CMOS controller allowing to control the low-power switch 310 without significant power losses during standby.

The switching converter 300 may use GaN based devices, such as GaN diodes, GaN resistances and GaN transistors.

The switching converter 300 may also be implemented using both Si and GaN technologies. This may be achieved using different chips for GaN and Si components, and then combining these chips within a package, also referred to as system in package or SIP.

Figure 4:
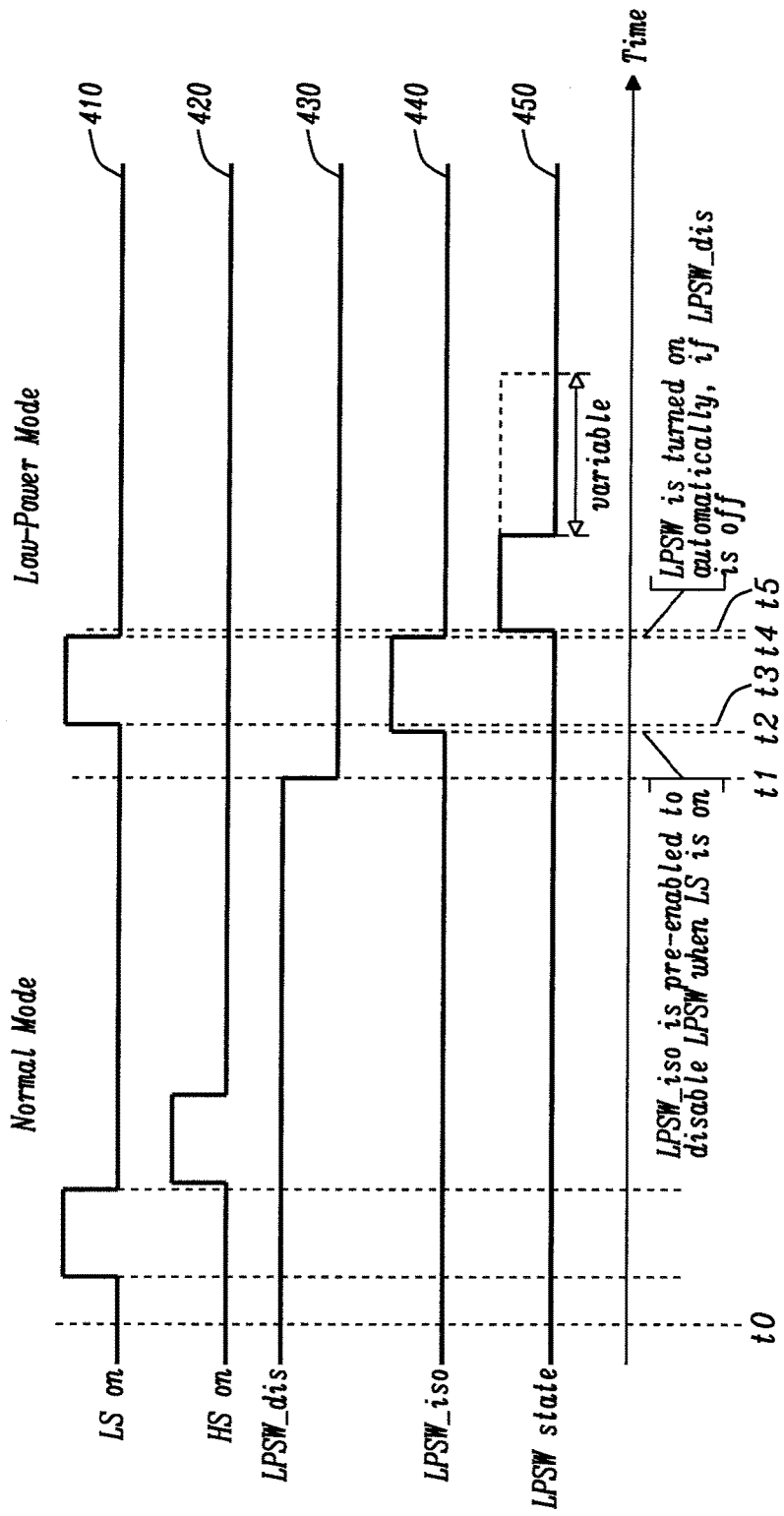
FIG. 4 is a timing diagram illustrating the working of the switching converter of FIG. 3.

FIG. 4 is a timing diagram showing the state, open or closed, of the different switches used in the power converter of FIG. 3. The time diagram includes the states labelled 410, 420, 430, 440 and 450 of the low-side power switch, the high-side power switch, the disconnection switch, the isolation switch, and the low-power switch respectively.

At time t0 the switching converter operates in a so called normal mode. Such a mode of operation may be identified by the controller 370 based on a plurality of sensing values. The disconnection switch 358 is on (closed) 430, hence disconnecting the low-power switch 352, which remains off (open) 450. When, the low-side power switch 310 is on, the high-side power switch is off. The high side power switch switches on a short time after the low side power switch is turned off. This short delay is referred to as dead time.

At time t1, the switching converter starts operating in a so called low-power mode. The low power level of the switching converter may be identified by the controller 370. The high-side switch 305 is turned off 420. The disconnection switch Q1 turns off (Vgs=0) 430, therefore enabling the gate control of the low-power switch 352.

At time t2, the isolation switch 360 turns on 440. Since the Zener diode D1 356 is forward biased, a current flows from LX to the ground via the isolation switch, hence disabling the low-power switch 352. This avoids turning on the LPSW via the resistance R1 during the on-time of the low-side power switch 310.

Shortly after, at time t3, the low-side power switch 310 turns on 410 and the primary winding 332 charges. The on-time of the low-side power switch 310 defines the amount of energy stored in the primary winding 332. FIG. 3 shows a primary inductor current I1 flowing through inductor 332.

At time t4, both the low-side power switch 310 and the isolation switch 360 turn off. The primary inductor current I1 is interrupted, the primary inductor 332 stops charging, and the voltage at node LX increases. An inductor current I2 starts from the inductor 332 towards the capacitor C1 in reverse conduction mode, hence charging the capacitor C1. This increases the drain voltage as well as the gate voltage of the LPSW 352.

At time t5, the gate to source voltage Vgs of the low-power switch 352 is sufficient (Vgs>Vth) to turns the low power switch on 450. When LPSW 352 is turned on, the energy stored in C1 causes a current I2 to flow from C1 via the LPSW (forward mode) to charge the primary inductor LP. The LPSW 352 will remain switched on, as long as there is enough energy in the capacitor C1 to maintain Vgs>Vth. Depending on the value of R1, the gate voltage of LPSW 352 will discharge via the low resistive drain-source path of the LPSW 352 until LPSW turns off. By choosing a resistance R1, that is relatively large it is possible to reach the desired gate voltage of the LPSW 352 quickly. For example, R1 may have a value ranging from about 100KΩ to several MΩ. In addition, this allows to reduce power dissipation in R1. If R1 is implemented in GaN technology, then R1 will have high-ohmic values for high substrate voltages, due to the 2DEG properties of GaN resistors. The resistor R1 will therefore have high-ohmic values when the voltage at the LX node is high.

The proposed active clamp circuit therefore provides a simple bidirectional and controllable path for the leakage energy present in the inductor of the switching converter. The leakage energy can be recycled and improve the efficiency of the switching converter. The low-power clamp circuit 350 does not depend on the high side driver 320. The low power switch 352 is not charged by the boot capacitor 322 but by the capacitor C1 315. As a result, the low-power clamp circuit 352 can operate even when the low-power switch on-time is very short. As a result, the switching converter can operate reliably even when the load is relatively low. The power consumption of the clamp circuit 350 depends mainly on the on-time of the isolation switch 360. Since in a low-power mode the duty cycle is low, the power losses in the clamp circuit can be considered negligible.

Figure 5:
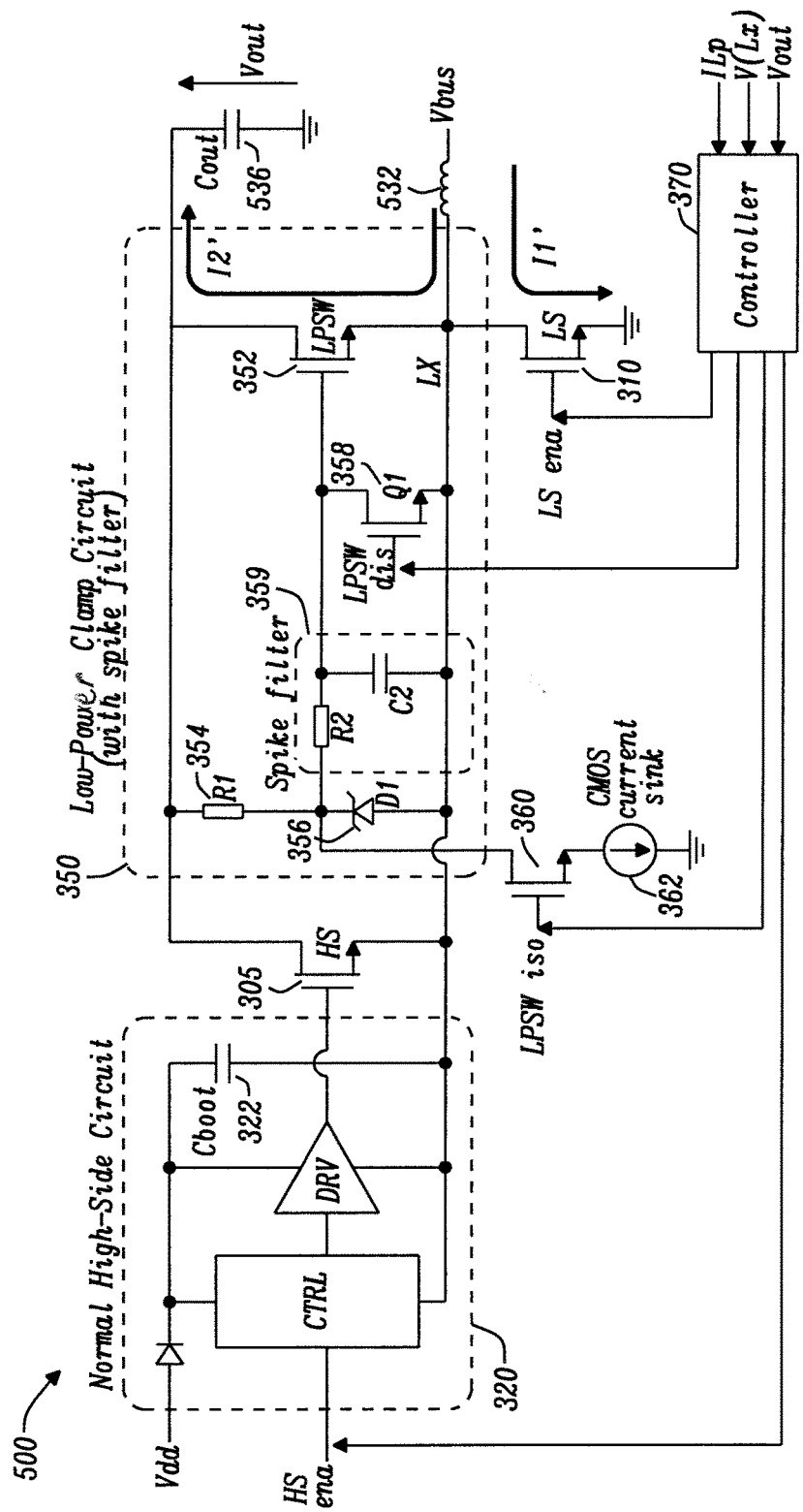
FIG. 5 is a diagram of a boost switching converter provided with a low-power clamp circuit.

FIG. 5 shows a diagram of another power converter 500. In this example, the power converter 500 is a boost converter provided with an active clamp circuit. The circuit of FIG. 5 shares common features with the circuit of FIG. 3 above, with like elements being indicated by like reference numbers. In particular, the power converter 500 includes a clamp circuit identical to the clamp circuit 350 described above.

The boost converter 500 includes an inductor 532 and an output capacitor Cout 536. The inductor 532 has a first terminal coupled to an input voltage Vbus and another terminal coupled to the switching node LX. The low-power switch 352 of the clamp circuit 350 has a first terminal, for example a drain terminal coupled to the output capacitor Cout 536, a second terminal, for example a source terminal coupled to the switching node LX, and a third terminal, for example a gate terminal coupled to a ground via another switch, referred to as isolation switch 360, for controlling isolation of the low-power switch gate from the ground.

In operation, when the controller 370 identifies a low power, the high-side switch 305 is turned off. The disconnection switch Q1 turns off, therefore enabling the gate control of the low-power switch 352.

A short time before the low side switch 310 turns on, the isolation switch 360 turns on and disables the low-power switch 352. When the low-side power switch 310 turns on the inductor 532 starts charging. The on-time of the low-side power switch 310 defines the amount of energy stored in the inductor 532. FIG. 5 shows an inductor current I1' flowing through inductor 532.

When both the low-side power switch 310 and the isolation switch 360 turn off, the inductor 532 stops charging, and the voltage at node LX increases. When the gate to source voltage Vgs of the low-power switch 352 is sufficient (Vgs>Vth) the low power switch 352 turns on. An inductor current I2' starts flowing from the inductor 532 towards the capacitor Cout 536 in reverse conduction mode, hence charging the capacitor Cout. As the inductor discharges into the capacitor Cout, the voltage at node LX starts decreasing, and eventually the LPSW 352 turns off.

A skilled person will appreciate that variations of the disclosed arrangements are possible without departing from the disclosure. The active-clamp circuit described above is not limited to fly-back or boost topology and could be applied to any other type of switching converter using a half-bridge configuration. For example, the active-clamp circuit could be used with a buck converter, or a buck-boost converter. Accordingly, the above description of the specific embodiment is made by way of example only and not for the purposes of limitation. It will be clear to the skilled person that minor modifications may be made without significant changes to the operation described.

What is claimed is:

1. A switching converter comprising:
a first power switch coupled to a second power switch via a switching node;
an inductor coupled to the switching node; and
a clamp circuit comprising a third power switch coupled in parallel to the first power switch;
the switching converter being adapted to disable the first power switch and to enable control of the third power switch upon identifying that the switching converter provides a low level of power;
wherein the third power switch comprises a power transistor having a first terminal coupled to a ground, a second terminal coupled to the switching node; and a third terminal coupled to a capacitor; wherein the first terminal is a gate terminal; and
the clamp circuit comprising a control switch coupled in parallel between the first terminal and the second terminal of the third power switch, and a resistor coupled in parallel between the first terminal and the third terminal of the third power switch.

2. The switching converter as claimed in claim 1, comprising a controller coupled to the clamp circuit, the controller being adapted to sense an electrical parameter of the switching converter; and to compare the electrical parameter with a threshold value to identify the level of power of the switching converter.

3. The switching converter as claimed in claim 1, wherein the clamp circuit is adapted
to turn off the third power switch when the second power switch is turned on, to charge the inductor; and
to turn on the third power switch when the second power switch is turned off, to charge the capacitor.

4. The switching converter as claimed in claim 1, wherein the first terminal is coupled to the ground via a ground isolation switch.

5. The switching converter as claimed in claim 1, comprising a Zener diode coupled in parallel with the control switch.

6. The switching converter as claimed in claim 1, wherein the third power switch is an enhancement mode power switch.

7. The switching converter as claimed in claim 1, comprising a filter coupled in parallel to the control switch.

8. The switching converter as claimed in claim 1, wherein at least one of the first power switch, the second power switch and the third power switch is a III/V semiconductor based transistor.

9. A method of operating a switching converter comprising a first power switch coupled to a second power switch via a switching node; an inductor coupled to the switching node and a capacitor; the method comprising
providing a clamp circuit comprising a third power switch coupled in parallel to the first power switch; and
upon identifying that the switching converter provides a low level of power, disabling the first power switch, and enabling control of the third power switch;
wherein the third power switch comprises a power transistor having a first terminal coupled to a ground, a second terminal coupled to the switching node; and a third terminal coupled to the capacitor; wherein the first terminal is a gate terminal; and
the clamp circuit comprising a control switch coupled in parallel between the first terminal and the second terminal of the third power switch, and a resistor coupled in parallel between the first terminal and the third terminal of the third power switch.

10. The method as claimed in claim 9, comprising
sensing an electrical parameter of the switching converter; and
comparing the electrical parameter with a threshold value.

11. The method as claimed in claim 9, comprising
turning off the third power switch when the second power switch is turned on to charge the inductor; and
turning on the third power switch when the second power switch is turned off to charge the capacitor.

12. The method as claimed in claim 9, wherein turning off the third power switch comprises lowering a gate voltage of the third power switch.

13. A clamp circuit for use with a switching converter comprising a capacitor coupled to a half bridge that includes a first power switch coupled to a second power switch via a switching node, the clamp circuit comprising a third power switch adapted to couple in parallel to the first power switch; wherein the third power switch has a first terminal for coupling to a ground, a second terminal for coupling to the switching node; and a third terminal for coupling to the capacitor; wherein the first terminal is a gate terminal; the clamp circuit being adapted to receive a signal from the switching converter to enable control of the third power switch upon identifying that the switching converter provides a low level of power; and the clamp circuit comprising a control switch coupled in parallel between the first terminal and the second terminal of the third power switch, and a resistor coupled in parallel between the first terminal and the third terminal of the third power switch.

14. The clamp circuit as claimed in claim 13, comprising a Zener diode coupled in parallel with the control switch.

15. The clamp circuit as claimed in claim 14, wherein at least one of the third power switch, the resistor and the Zener diode is a III/V semiconductor based component.

16. The clamp circuit as claimed in claim 13, wherein the third power switch is an enhancement mode power switch.

17. The clamp circuit as claimed in claim 13, comprising a filter coupled in parallel to the control switch.

* * * * *